VOLTAGE CONVERTER AND CONVERTER SWITCHING ARRANGEMENT

Filed May 31, 1966

INVENTOR:
WILLIAM G. MUSTAIN,

BY [signature]
HIS ATTORNEY.

United States Patent Office 3,382,426
Patented May 7, 1968

3,382,426

VOLTAGE CONVERTER AND CONVERTER SWITCHING ARRANGEMENT

William G. Mustain, Lynchburg, Va., assignor to General Electric Company, a corporation of New York Filed May 31, 1966, Ser. No. 554,127
10 Claims. (Cl. 321—21)

This invention relates to a conversion network for matching the characteristics of a primary supply voltage to the characteristics required by the equipment to be energized thereby and, more particularly, it relates to a converting network which includes a switching circuit coupled to the converter, which is operative to energize the converter only in response to the actuation of the load or utilization circuit in order to minimize the current drain on the primary supply source.

The load-switched converter arrangement of the instant invention will, for the sake of convenience, be described in an environment where the converter is energizing a two-way mobile radio, since the dual problem of matching the primary voltage source characteristics to the characteristics required by the equipment and the need for minimizing drain on the primary supply source is perhaps most acute there. It will be understood, however, that the invention is not limited to use with a piece of communication equipment such as a two-way radio, but is equally applicable in any situation where such a conversion must be made while yet, at the same time, minimizing current drain by making sure that the converting equipment is not energized continuously but is operative only when the load circuit is to be energized.

In a typical two-way mobile radio system, the radio equipment is installed in some form of moving vehicle, be it automobile, truck, motorcycle, or railroad train, and operates from a primary supply source within the vehicle, which is typically, in the case of an automobile, the vehicle battery.

These primary vehicular supply sources quite often vary, depending on the type, age, and make of the vehicle. For example, there are 6-volt, 12-volt, and 28-volt, as well as positive and negative-ground battery systems. All of these variation, either in the amplitude or reference level of the primary supply voltage for the radio equipment, of course, introduce difficulties for the manufacturer, since the equipment must, somehow, operate with all these various primary DC supply sources.

From the standpoint of maximizing ease and simplicity of manufacture and minimizing cost, it is obviously more economical to build only one type of radio unit, rather than having to build and stock a plurality of different units to accommodate the different primary voltages. For example, if 75% of the radio units will be installed in vehicles having a 12-volt negative-ground primary battery supply source, it is highly desirable from the manufacturer's standpoint, of course, to build his radio equipment to meet this type of specification. However, if the equipment is built and designed for a 12-volt negative-ground system, the manufacturer is faced with substantial difficulty in the event that the radio must be installed in a positive-ground system, or in a system having battery voltages other than the 12 volts.

For example, if the radio equipment must go into a positive-ground system, it is necessary somehow to provide a positive DC voltage with respect to ground in order to energize the various components of the radio equipment that have the negative side of their circuits tied to the radio chassis ground. In the past, this problem has been solved in two different ways, both of which are not entirely satisfactory, since they usually introduce extra costs for additional components, or extra cost in terms of fabricating and installing the equipment. One of these alternatives was to "float" all of the circuits or equipments in the radio which run directly from the battery voltage; such as the internal radio power supply, for example. However, by "floating" the equipment, it is necessary that all of the radio units, whether they are to be installed in the positive or negative-ground systems, include by-pass capacitors for AC, which by-pass capacitors are connected to chassis ground in order to eliminate the various AC potentials within the unit. This, of course, introduces an extra cost factor, since units which are operated in negative-ground systems do not really need the capacitors to function properly. However, they are included in order to have a unit which can be installed in both types of systems. This is, of course, a highly unsatisfactory situation since the added cost must be included in many instances without the components actually performing a useful function.

An alternative approach to this problem in the past has been to provide space within the radio housing for connection of an internal converter to be installed whenever the unit is to be used with a positive-ground system. That is, if it is known that a particular radio unit is to be installed in a positive-ground system, a DC-to-DC converter is installed within the space provided in the housing with the negative output terminal of the DC converter being grounded to supply a positive voltage with respect to ground. This, again, is far from satisfactory, since space for the converter must be provided in all the radios for use with positive-ground systems, even though this space is not used whenever the radio is installed in a negative-ground system. Furthermore, from the manufacturing standpoint, additional cost is added since two separate models must now be provided—one including the converter, and one without the converter—thus introducing extra cost and complication in the manufacture, stocking and assembly of equipment. Similarly, if the radio is to be used in a 6-volt or 28-volt primary system, the radio equipment must be changed at least to the extent of providing a different power supply for the 6-volt, 28-volt, or other voltage-level systems. This again adds cost and inconvenience to a manufacturing operation.

A need exists, therefore, for an arrangement in which the conversion of the primary voltage-source characteristics to match those required by the radio equipment is performed outside of the radio equipment, so that a single radio unit is compatible with all vehicular supply systems and only the external converter unit is varied. However, if such an external converter is provided, it is difficult to disconnect the converter mechanically in conjunction with the on-off switch of the radio without using elaborate mechanical ganged switches or the like. If, on the other hand, the converter is not disabled whenever the radio is switched off, the converter presents a continuous drain on the battery, even when the radio is not on, a condition which is highly undesirable in a vehicle radio system where the primary source, i.e., the battery, is one of finite capacity.

It is a primary objective of this invention, therefore, to provide a voltage-converter arrangement between a primary power source and a load, wherein the system includes a load-controlled converter switch for automatically connecting and disconnecting the converter from the source as the load is switched on and off.

Another objective of this invention is to provide a converter arrangement between a primary source and a load, wherein the converter converts the voltage from the primary source to conform to the characteristics required by the load, and which is selectively connected to the primary source when the load is switched on.

Still another objective of this invention is to provide an arrangement for converting the characteristics of a primary input voltage source to a different set of characteristics compatible with those required by a load to be connected to the primary source, and a solid-state switching arrangement responsive to the connection of the load into the circuit to actuate the converter.

Other objectives and advantages of this invention will become apparent as the description thereof proceeds.

In carrying out the invention and achieving its various objectives, a DC-to-DC converter is coupled to the terminals of the primary supply source, such as the vehicle battery, through a solid-state converter input switch. The converter input switch, in turn, is actuated in response to a load-responsive converter control transistor switch connected between the output of the converter and the load. Whenever the load is connected to the supply source, a current path is established through the load, which actuates the load-responsive converter transistor switch. Actuation of this transistor control switch actuates the converter input switch to close it and apply the primary supply voltage from the input terminal to the input of the converter which, in turn, converts the primary supply voltage characteristics, either in terms of a change in amplitude or a change in the polarity of the terminal which is grounded, to be compatible with the requirements of the load. Whenever the load is disconnected, the load-responsive converter control switch is de-energized, deactivating the converter input switch and removing the primary input voltage from the converter. Through the medium of the load-responsive converter control switch, the DC-to-DC converter is selectively disconnected from the primary supply source so as to convert the input voltage only when the utilization circuit, such as the two-way radio, has been connected to the supply source, thereby minimizing the current drain on the primary supply source when the radio is off.

The novel features which are believed to be characteristic of this invention are set forth with particularity in the appended claims. The invention, itself, however, as to its organization and method of operation, may best be understood by reference to the following description taken in connection with the accompanying drawings in which:

Figure 1:
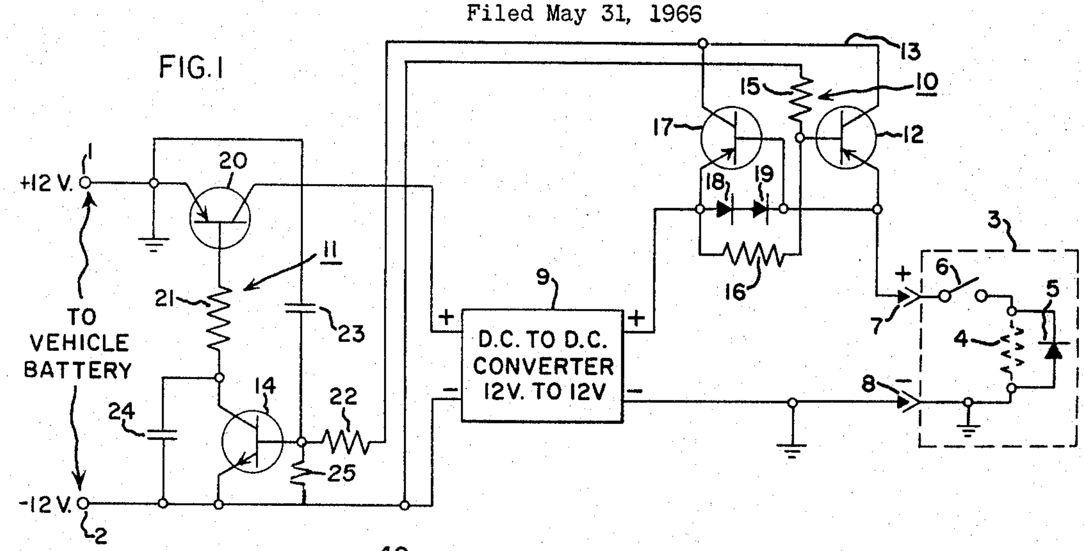
FIGURE 1 illustrates, schematically, a converter and load-actuated converter switch arrangement connected between a primary supply source and a load, in which the converter produced an output in which the reference or ground level of the converter output is opposite in polarity to that of the input voltage from the primary supply source.

The load-controlled converter and converter-switching arrangement illustrated in FIGURE 1 is to be utilized with a positive-ground primary supply source to produce a voltage which is positive with respect to ground from the primary voltage which is negative with respect to ground. Input terminals 1 and 2 are connected to a 12-volt vehicle battery, not shown, the positive terminal of which is grounded. The voltage from the primary supply source is intended to energize a load shown generally at 3. The load, for the sake of simplicity, is shown as a resistor 4, shunted by a protective diode 5, and is connected through a manually operated switch 6 to a pair of detachable connector terminals 7 and 8, which are coupled to the supply source. The load 3, as pointed out above, may be a two-way radio which is normally designed for use with a negative-ground system, in that the negative terminals or leads of the various circuits in the radio are, as shown in FIGURE 1, customarily connected directly to the chassis ground. In order to energize and operate the radio, an energizing voltage which is positive with respect to ground must be produced. A DC-to-DC converter 9 is coupled between the primary source input terminals 1 and 2 and connectors 7 and 8 which constitute the load input terminals. As may be seen by observation, the converter, in this instance, is a DC-to-DC converter which takes a 12-volt input and produces a 12-volt output. However, the negative output line from the converter is grounded so that the output voltage from the converter which is applied to the load is now positive with respect to ground, so that the characteristics of the output voltage from the converter matches the characteristics of the voltage required by the radio.

In order to minimize the current drain on the primary source, converter 9 must be automatically disconnected from the source during those intervals when the radio is in the inoperative condition. Therefore, a load-responsive solid-state converter-control switch 10, connected between the load and the positive output terminal of the converter, is provided to control a converter-input switch 11. The load-responsive converter control switch is actuated only when the radio is switched on by the closing of on/off switch 6 and this, in turn, operates converter-input switch 11 to apply the voltage from the primary supply source to the input of the converter.

Load-responsive converter control switch 10 includes a PNP transistor turn-on switch 12, having an emitter connected to load input terminal 7, a collector connected via lead 13 to the base of control transistor 14 of the converter input switch, and a base connected through a suitable dropping resistor 15 to the negative terminal of the supply source and through a resistor 16 to the positive output terminal of converter 9. Connected in shunt with turn-on switch 12 is a transistor hold-in switch 17 which maintains the converter input switch in the operative condition as long as the load is connected to the output of converter 9. Hold-in switch 17 is a PNP transistor having an emitter connected to the positive output terminal of converter, and a base connected through diodes 18 and 19 to emitter 7. The collector of transistor switch 17 is connected to the collector of switch 12 and, in turn, to control transistor 14 of the input switch. By connecting diodes 18 and 19 between the base and emitter, transistor 17 is biased into and maintained in the conducting state whenever there is an output from converter 9, since this drives the diodes into conduction. That is, the forward drop across the series-connected diodes 18 and 19 maintains the base-emitter junction of this transistor forward-biased as long as there is an output from the converter.

Transistor turn-on switch 12 is initially actuated by closing of switch 6, and is turned off and driven into the non-conducting state whenever there is an output from converter 9. The base of transistor switch 12 is connected to the positive output terminal of the converter through resistor 16. When converter 9 is energized and produces an output, the voltage at the base of the transistor is established by the relative magnitudes of resistors 15 and 16, which form a voltage divider between the −12-volt terminal 2 and the +12-volt output terminal of converter 9. By making the resistance of resistor 15 substantially larger than that of resistor 16, the major part of the voltage drop occurs across resistor 15 and the base of PNP transistor 12 is driven positive relative to its emitter and into the non-conducting state. However, hold-in transistor switch 17 is now in the conductive state, thereby maintaining converter input switch 11 actuated as long as the load is connected to the output of converter 9.

Converter input switch 11 consists of a main series switching transistor 20 and control transistor 14. The emitter-collector path of PNP transistor 20 is connected between positive input terminal 1 and an input terminal of converter 9, and its base is connected through control transistor 14 and dropping resistor 21 to negative input terminal 2. Control transistor 14, which is actuated by the load-responsive switch 10 and connects the base of transistor 20 to negative terminal 2, is an NPN transistor, having its collector connected to the base of transistor 20 through resistor 21, its emitter connected directly to the negative terminal 2 of the primary supply source, and its base is connected through a current-limiting resistor 22 to the collectors of transistor turn-on switch 12 and transistor hold-in switch 18 and through leakage current resistor 25 to terminal 2.

In operation with the radio turned off, switch 6, which may be the on-off switch of the radio, is open and there is no current path for transistor 12. Turn-on switch 12 is, therefore, in the non-conducting state and provides no base-current drive for control transistor 14 of converter input switch 11. Control transistor 14 is thus also in the non-conducting state, and its collector-emitter resistance is very high. Main series-switching transistor 20 is, thus, in its non-conducting state. With transistor 20 in the non-conducting state, the resistance of its emitter-collector path between terminal 1 and the input terminal of converter 9 is sufficiently high so that the primary input voltage is disconnected from the input of converter 9. There is, therefore, no current drain on the primary supply source during the period when the radio is turned off.

When the radio is turned on and the load is applied by the closing of switch 6, a current path is completed for turn-on transistor switch 12 through the load 4 or the protective diode 5 to ground. Inasmuch as the base is connected to the negative terminal of the input primary source through resistor 15, the base-emitter junction of transistor 12 is forward-biased, the transistor becomes conductive and collector current flows over line 13 and current-limiting resistor 22 to the base of control transistor 14. The collector current provides base current drive for the control transistor, turning the transistor on, and driving it into saturation. The resistance of its collector-emitter path drops to a very low value, thereby connecting the base of main series-switching transistor 20 to negative input terminal 2. Main series-switching transistor 20 is driven into saturation and the resistance of its collector-emitter path drops to a very low value, connecting the grounded positive input terminal 1 to the converter, and applying the primary voltage. The converter, which may be of any well known type, produces an output voltage of the same amplitude as the input voltage, i.e., a 12-volt to 12-volt converter, for example, except that the negative output terminal of the converter is grounded, thereby providing a voltage which is positive with respect to ground from a primary source which provides a voltage which is negative with respect to ground.

The positive output voltage from converter 9 drives series-connected diodes 18 and 19 into conduction and the forward voltage drop across the diodes biases the base of PNP hold-in transistor switch 17 slightly negative with respect to its emitter. The base-emitter junction is thus forward-biased, driving the transistor into conduction so that hold-in transistor provides the base drive for control transistor 14 as long as load switch 6 remains in the closed condition. The positive output voltage from converter 9 concurrently drives transistor turn-on switch 12 into the non-conducting state because of the voltage-dividing action of resistors 15 and 16, so that switch 12 is turned off but hold-in switch 17 takes over the function of controlling converter input switch 11.

If the load is now removed by opening switch 6 and turning the radio off, current ceases to flow through diodes 18 and 19 and there is no voltage drop across these diodes. The base of hold-in transistor 17 is now no longer negative with respect to its emitter, the base-emitter junction is no longer forward-biased, thereby driving transistor 17 into the non-conducting state. This interrupts the flow of collector current and terminates the base current drive for control transistor 14. Control transistor 14 is, therefore, switched from saturation into the non-conducting state, which in turn disconnects the base of main series switching transistor 20 from the negative primary supply terminal 2. This drives transistor 20 into the non-conducting state and the resistance of its emitter-collector path rises to a very high value, thereby removing the primary supply voltage from the converter input terminal disconnecting the converter from the primary supply source. It will be apparent, therefore, that the moment the load is disconnected by load switch 6, the primary supply voltage is removed from the input of the converter, eliminating the drain on the primary supply source during those intervals when the load is disconnected.

Capacitors 23 and 24, connected respectively between the emitter of transistor 20 and the base of transistor 14 and across the collector-emitter path of transistor 14, are provided to increase the switching speed of control transistor 14 and main series-switching transistor 20 whenever the load-responsive converter-control switch 10 is actuated by the load.

The form of the invention illustrated in FIGURE 1 relates to a converter arrangement in which the primary supply source is one with the point of reference potential of one polarity, i.e., a positive ground system, whereas the utilization circuit such as the radio was designed to operate with a point of reference potential of the opposite polarity, i.e., a negative ground system. However, the instant invention is not limited to systems where the point of reference or ground of the primary supply voltage is different from that required by the utilization circuit. Circumstances may arise where the primary supply voltage characteristic that must be converted to conform to the requirements of utilization circuit is the amplitude of the supply voltage. Thus, for example, a piece of radio eqiupment may be designed to operate from a 12-volt source based on a conscious design decision that most vehicle systems will be 12-volt systems. When such a radio must be installed in a 6-volt system, for example, it is highly undesirable to change the 12-volt internal power supplies to accept a 6-volt primary supply voltage. Rather than changing the radio, therefore, it is preferable to provide a conversion system connected between the primary supply source and the input to the radio to convert the voltages to one which the radio power supply can utilize without any change in that power supply.

Figure 2:
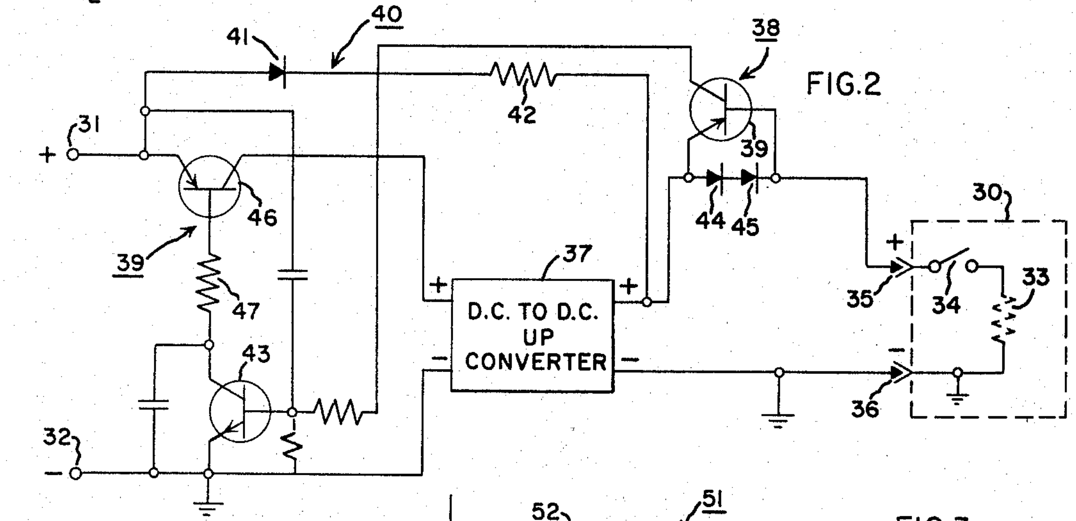
FIGURE 2 is a load-controlled converter and switch in which the converter operates to raise the amplitude of the input voltage from the primary supply source.

FIGURE 2 illustrates such a system in which the primary supply voltage is less than the nominal supply voltage for which the load equipment is designed. Thus, in the system of FIGURE 2, the primary supply voltage may be a 6-volt negative-ground system, whereas the load shown generally at 30 is one designed to operate in a 12-volt negative-ground system. Some external means must be provided for converting the primary supply voltage at input terminals 31 and 32 to a 12-volt supply while, at the same time, minimizing the drain on the primary source by disconnecting the conversion unit whenever the radio load is not applied. Load 30 is again illustrated schematically by means of a resistor 33, but may be two-way radio equipment or any other load which is connected through a load switch 34 to a pair of input connectors 35 and 36, to the output of a DC-to-DC up-converter 37. The DC-to-DC up-converter converts the 6-volt primary voltage, for example, at input terminals 31 and 32 to the 12-volts required by the power supply of the radio. The system again includes a load-responsive converter-control switch, shown generally at 38, which is actuated whenever load switch 34 is closed and, in turn, energizes the converter input switch shown generally at 39 to apply the primary voltage to the input of converter 37.

The load-responsive converter-control switch differs from the one illustrated in FIGURE 1 in that only a single transistor hold-in switch is required and the separate transistor turn-on switch is eliminated. The turn-on switch of FIGURE 1 provided base current drive for the control transistor of the converter input switch when the load switch was initially closed and was turned off when the converter produced an output voltage; with the hold-in transistor switch maintaining the converter input switch in the operative condition as long as the load was applied. In the circuit of FIG. 2, the turn-on switch may be eliminated by providing a starting current path, shown at 40, for the load-responsive converter switch when switch 34 is closed. The starting current path is connected between positive input terminal 31 and the positive output terminal from up-converter 37. Since the amplitude of the output voltage from converter 37 is greater than the primary input voltage, the starting current path is automatically disconnected after the converter is energized because the unidirectional conducting device, such as diode 41 included in the path is then reversed biased. It may be seen that as soon as the input voltage is applied to the converter through the action of switch 38 and converter input switch 39, the positive output terminal of the converter is more positive than the voltage at primary input terminal 31, thereby reverse-biasing diode 41 and disconnecting the starting current path. Thus, the need for a transistor turn-on switch is eliminated by the action of the starting current path.

The load-responsive converter control switch 38 consists of a PNP transistor 43, having its emitter connected to the positive terminal of up-converter 37, and its collector connected to control transistor 43 of the converter input switch to actuate the input switch whenever load-responsive converter-control switch is turned on. The base of transistor 38 is connected to the emitter through a pair of series diodes 44 and 45 poled in the forward direction of current flow. Thus, whenever the converter 37 is energized and produces an output voltage, diodes 44 and 45 conduct. The forward voltage drop across the conducting diodes forward-biases the base-emitter junction of transistor 38, maintaining it in the conductive state and actuating control transistor 43 in the converter input switch as long as the load is applied.

The converter input switch 39 is generally of the same configuration as that shown in FIGURE 1 and includes a main series switching transistor 46 and a control transistor 43. The emitter-collector path of PNP transistor 46 is connected between the converter and input terminal 31 and its base is connected through current dropping resistor 47 and the collector-emitter path of NPN control transistor 43 to input terminal 32. The conducting state of main series-switching transistor 46 is again controlled by the conductive state of control transistor 43, which is, in turn, actuated by load-responsive converter control switch 38 whenever the load is connected to the converter circuit.

In operation, closing of the on/off load switch 34 completes a current path between the positive terminal 31 of the primary supply source and ground through load 33, the forward-poled diodes 44 and 45 and the starting current path which includes resistor 42 and diode 41. It will be apparent that when switch 34 is closed, diode 41 is forward-biased since its anode is connected to the positive input terminal 31 and its cathode through diodes 44 and 45 to ground. Current flow is established through this path and provides a forward voltage drop across diodes 44 and 45 connected between the emitter and base of load-responsive control switch 38. The drop across the diodes forward-biases the base-emitter junction of transistor 38 and produces a flow of collector current from the transistor to the base of control transistor 43. This drives transistor 43 into saturation, connecting the base of main series-switching transistor 46 to negative terminal 32 of the supply source and driving it into saturation. When transistor 46 is driven into saturation, the resistance of its emitter-collector path drops to a very low value, thereby connecting input terminal 31 to the positive input terminal of the DC up-converter 37, energizing the converter. A positive voltage which is of a greater magnitude than the input voltage at terminals 31 and 32 is produced at the output of converter 37. The cathode of diode 42 in the starting current path is, therefore, now more positive than its anode, and the diode is reverse-biased, disconnecting the starting current path from the load. However, the positive output voltage from converter 37 maintains diodes 44 and 45 conducting and maintains the load-responsive converter-control switch transistor 38 in the conductive state as long as load switch 34 is closed.

Whenever the load is disconnected by opening load switch 34, the current path for diodes 44 and 45 is interrupted, the base-emitter junction of transistor 38 is no longer forward-biased, driving it into the non-conducting state and interrupting the flow of collector current. The base current drive for control transistor 43 is interrupted, driving transistor 43 into the non-conducting state and disconnecting the base of main series transistor 46 from terminal 32. Main series switching transistor becomes non-conducting, thereby removing the primary supply voltage from the input of converter 37. The converting system is therefore, disconnected from the primary supply source whenever the load is disconnected, thereby minimizing the current drain on the primary supply source.

Figures 3, 4:
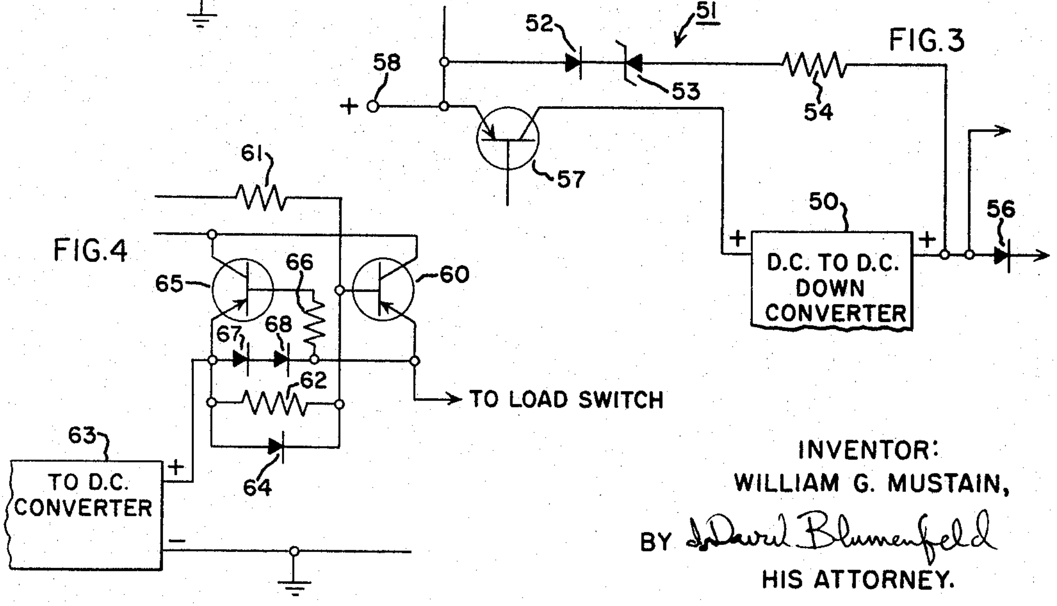
FIGURE 3 is a fragmentary illustration of a portion of circuit of FIGURE 2 wherein the converter is one which reduces the amplitude of the voltage from the supply source.
FIGURE 4 is a fragmentary showing of an improvement in one portion of the circuit illustrated in FIGURE 1.

FIGURE 3 is a fragmentary illustration of a circuit similar to FIGURE 2 where the primary supply voltage is of a greater magnitude than the supply voltage for which the radio load is designed. Thus, typically, in the circuit of FIGURE 3, the primary supply voltage may, for example, be a 28-volt supply source, whereas the utilization circuit, such as the radio, is again designed for operation with a 12-volt supply source. Therefore, in the system of FIGURE 3, a DC-to-DC down-converter 50 is utilized in place of the up-converter of FIGURE 2. The amplitude of the output voltage from down-converter 50 is thus lower than that of the primary supply voltage and, hence, the starting current path, shown generally at 51, must, in addition to a diode 52, include a voltage reference element such as Zener diode 53 to disconnect the starting current path after the load-responsive converter control switch has been actuated to apply the primary voltage to the input of the converter. That is, as described in connection with FIGURE 2, whenever the load is applied by the closing of a load switch, a current path is completed through the diode 52 poled in the forward direction of current flow, the Zener diode 53, a dropping resistor 54, and the diodes, only one of which is shown at 56, connected between the emitter and base of the load-responsive control switch transistor, not shown. This, in turn, drives the main series switching transistor 57 into the conducting state, thereby impressing the primary supply voltage at positive input terminals 58 on the input of the DC down-converter 50. In the absence of an element such as the Zener diode, the lower output voltage from converter 50 would not be able to disconnect the starting path since the cathode of diode 52 remains more negative than its anode. However, when converter 50 produces an output voltage, Zener diode 53 disconnects the starting current path from the circuitry, and the load-responsive converter-control switch continues to control the application of the input of the primary supply voltage to the converter as long as the load is connected to the circuit.

FIGURE 4 illustrates a modification of the load-responsive converter control switch illustrated in FIGURE 1. The load-responsive converter control switch again consists of a PNP transistor turn-on switch 60, having its emitter connected to the load and the load-switch, not shown, a base connected through a resistor 61 to the negative terminal of the primary input supply source, and through resistor 62 to the positive output terminal of converter 63. The transistor turn-on switch as discussed previously is actuated whenever the load switch is closed to produce collector current flow. The collector current actuates the control transistor, not shown, of the converter input switch to apply the primary supply voltage to the input of converter 63 to produce a positive output voltage with respect to ground. This drives transistor turn-on switch 60 into the non-conducting state by the application of a positive bias voltage to its base. Resistors 61 and 62, which form a voltage divider between the −12 and +12-volt terminals are so arranged that the greater portion of the voltage drop occurs across resistor 61, applying a positive voltage to the base of transistor 60 and driving it into the non-conducting state. To insure that a positive bias-voltage is applied to the base of transistor 60 whenever there is an output from converter 63, a diode 64, which is connnected in shunt with resistor 62 is driven into the conducting state to apply the positive voltage at the output of converter 63 to the base of transistor 60. By providing diode 64 the turn-off of transistor 60 is independent of primary supply voltage variations.

The load-responsive converter-control switch 60 also includes a hold-in transistor switch 65, which is energized by the output voltage from converter 63, and takes over the function of turn-on switch 60 to maintain the converter input switch actuated as long as the load is applied to the output of the circuit. Hold-in transistor 65 is a PNP transistor, the emitter of which is connected to the positive terminal of the converter and the collector of which is connected to the converter-input switch. The base of the transistor is connected through base-emitter current-limiting resistor 66 and a pair of forward-poled diodes 67 and 68 to the emitter of the transistor. Upon the appearance of an output voltage from converter 63, diodes 67 and 68 are driven into conduction and current flows from the positive output terminal of the converter through the diodes and the load to ground. The forward voltage drop across these two series-connected diodes, therefore, maintains the base of the transistor more negative than the emitter, maintaining the base-emitter junction in the forward-biased state as long as the load is connected. As long as this transistor remains in the conducting state, the converter input switch is actuated, continuing to apply the primary supply voltage to the input of the converter. Whenever the load is disconnected by actuation of the load on/off switch, the current flow through diode 67 and 68 is interrupted, removing the forward-biasing voltage across the base-emitter junction of the transistor, driving transistor 65 into the non-conducting state. This removes the base drive for the transistors forming part of the converter input switch and the primary supply voltage is disconnected from the input terminals of converter 63, interrupting the current flow through the converter. It will be seen that again the converter functions only as long as the load is connected, so that the conversion equipment does not operate when the load is disconnected and does not provide a continuous current drain on the primary supply source.

While particular embodiments of this invention have been shown and described above, it will, of course, be understood that the invention is not limited thereto, since many modifications both to the circuit arrangement and in the instrumentalities employed may be made. It is contemplated by the appended claims to cover any such modification which falls within the true spirit and scope of this invention.

What is claimed as new and desired to be secured by U.S. Letters Patent is:

1. In a selectively actuated voltage conversion arrangement for providing a supply voltage having predetermined characteristics from a primary supply voltage having different characteristics, the combination comprising:

(a) a pair of input terminals adapted to have a unidirectional primary supply voltage impressed thereon, said primary voltage having a given set of characteristics, (b) a pair of output terminals adapted to have load-circuit selectively connected thereto, said load circuit requiring a unidirectional supply voltage having characteristics differing from those of the primary voltage for proper operation, (c) a voltage converter for converting the primary voltage so that the characteristics of the output voltage from the converter are the same as those required by the load circuit, the output of said converter being coupled to said output terminals and the input of said converter being coupled to said input terminals, (d) load-controlled switch means for selectively applying the primary voltage to the input of said converter only when the load circuit is connected to said output terminals including, (1) a solid-state load-responsive converter control switch coupled to said output terminals and said converter whereby connection of said output terminals establishes a current path for energizing said control switch, (2) a converter input switch coupled between said input terminals and said converter, and (3) means coupling the converter control switch in circuit with said input switch whereby energization of said control switch and current flow therethrough actuates said input switch to apply the primary voltage to said converter only if the load circuit is connected to the output terminals to minimize the current drain on the source supplying said primary voltage.

2. The voltage conversion arrangement according to claim 1 wherein said primary voltage has one polarity with respect to ground and the converter output terminal of the opposite polarity is grounded whereby the supply voltage is of the opposite polarity with respect to ground.

3. The voltage conversion arrangement according to claim 1 wherein said converter is a down converter to reduce the amplitude of the primary voltage.

4. The voltage conversion arrangement according to claim 1 wherein said converter is an up converter to raise the amplitude of the primary voltage.

5. The voltage conversion arrangement according to claim 1 wherein the converter control switch means includes a turn-on transistor having an emitter, base and collector, and said input switch includes a series switching transistor having a base, emitter, and collector with the emitter-collector path thereof connected between one input terminal and the input of said converter means coupling the emitter-collector path of said turn-on transistor between an output of the converter and the transistor of said input switch to drive into conduction and apply the primary voltage to said converter whenever said turn-on transistor conducts in response to the load being connected to the output terminals.

6. The voltage converter arrangement according to claim 5 wherein said control switch includes a further hold-in transistor having a base, emitter and collector, the base of said transistor being coupled to the output of said converter, unidirectional conducting means connected between the base and emitter of said transistor, said unidirectional means being driven into conduction by the output voltage from said converter to forward-bias said hold-in transistor and drive it into the conducting state, and means to couple the emitter-collector path of said hold-in transistor to the series switching transistor of said input switch to maintain it in the actuated state once the converter has been energized.

7. The converter arrangement according to claim 6 wherein said input switch includes a further control transistor, connected in the base circuit of said series switching transistor, means coupling said turn-on and hold-in transistors to said control transistor to drive said series transistor into the conducting state and maintain it in that state as long as the load circuit is connected to said output terminals.

8. The voltage converter arrangement according to claim 5 which includes a starting current path between one input terminal and the output of said converter to establish a current flow and actuate the transistor in said control switch when the load is connected to the output terminals.

9. The voltage converter arrangement according to claim 8 wherein said starting current path includes a unidirectional conducting device for disconnecting said path once the converter is energized.

10. The converter arrangement according to claim 8 wherein said starting path includes a unidirectional device and a voltage reference element for disconnecting said path once the converter is energized.

References Cited

UNITED STATES PATENTS

| | | | |
|---|---|---|---|
| 2,884,518 | 4/1959 | O'Neill | 325—492 |
| 3,040,271 | 6/1962 | Murphy et al. | 325—492 XR |
| 3,070,737 | 12/1962 | Johnson et al. | 321—2 |
| 3,160,829 | 12/1964 | Mahland | 321—2 |

JOHN F. COUCH, *Primary Examiner.*

WARREN E. RAY, *Examiner.*

W. M. SHOOP, *Assistant Examiner.*